(12) United States Patent
Cui

(10) Patent No.: US 12,455,660 B2
(45) Date of Patent: Oct. 28, 2025

(54) OPTICAL TOUCH DETECTION CIRCUIT AND OPTICAL TOUCH DISPLAY PANEL

(71) Applicant: Shenzhen China Star Optoelectronics Semiconductor Display Technology Co., Ltd., Shenzhen (CN)

(72) Inventor: Wei Cui, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/440,291

(22) PCT Filed: Jul. 16, 2021

(86) PCT No.: PCT/CN2021/106744
§ 371 (c)(1),
(2) Date: Jan. 12, 2023

(87) PCT Pub. No.: WO2023/279428
PCT Pub. Date: Jan. 12, 2023

(65) Prior Publication Data
US 2025/0103167 A1 Mar. 27, 2025

(30) Foreign Application Priority Data
Jul. 5, 2021 (CN) .................. 202110758670.X

(51) Int. Cl.
*G06F 3/042* (2006.01)
*G06F 3/041* (2006.01)
(Continued)

(52) U.S. Cl.
CPC .......... *G06F 3/0421* (2013.01); *G06F 3/0412* (2013.01); *G06F 3/0416* (2013.01);
(Continued)

(58) Field of Classification Search
CPC ...... G06F 3/0421; G06F 3/0416; G06F 3/042; G06F 3/0412; G06F 3/044; H10F 30/282; H10F 39/103; H10F 77/1662
See application file for complete search history.

(56) References Cited

U.S. PATENT DOCUMENTS

| | | | |
|---|---|---|---|
| 2018/0120614 A1* | 5/2018 | Shin | H10K 59/60 |
| 2022/0262834 A1* | 8/2022 | Meng | H04N 25/778 |
| 2022/0310672 A1* | 9/2022 | Cui | H10F 39/103 |

FOREIGN PATENT DOCUMENTS

| | | |
|---|---|---|
| CN | 103353813 A | 10/2013 |
| CN | 104679355 A | 6/2015 |

(Continued)

OTHER PUBLICATIONS

International Search Report in International application No. PCT/CN2021/106744, mailed on Apr. 8, 2022.
(Continued)

*Primary Examiner* — Cory A Almeida
(74) *Attorney, Agent, or Firm* — Nathan & Associates Patent Agents Ltd.; Menachem Nathan

(57) ABSTRACT

An optical touch detection circuit and an optical touch display panel are provided. The optical touch detection circuit includes a photosensitive module and a detection module. The photosensitive module is configured to generate a photoelectric signal. The detection module is connected to the photosensitive module. The detection module is configured to implement an optical touch function based on the photoelectric signal. The provided optical touch detection circuit and optical touch display panel can improve a signal-to-noise ratio of the optical touch detection circuit. This is beneficial for accurately determining a position of an optical touch.

7 Claims, 10 Drawing Sheets

(51) Int. Cl.
*G06F 3/044* (2006.01)
*H10F 30/282* (2025.01)
*H10F 39/10* (2025.01)
*H10F 77/166* (2025.01)

(52) U.S. Cl.
CPC .............. *G06F 3/042* (2013.01); *G06F 3/044* (2013.01); *H10F 30/282* (2025.01); *H10F 39/103* (2025.01); *H10F 77/1662* (2025.01)

(56) References Cited

FOREIGN PATENT DOCUMENTS

| | | | |
|---|---|---|---|
| CN | 106940602 A | 7/2017 | |
| CN | 106952612 A | 7/2017 | |
| CN | 111354756 A | 6/2020 | |
| CN | 112086530 A | 12/2020 | |
| CN | 112363642 A | 2/2021 | |
| CN | 112670303 A | 4/2021 | |

OTHER PUBLICATIONS

Written Opinion of the International Search Authority in International application No. PCT/CN2021/106744, mailed on Apr. 8, 2022.
Chinese Office Action issued in corresponding Chinese Patent Application No. 202110758670.X dated Dec. 13, 2022, pp. 1-9.

* cited by examiner

OPTICAL TOUCH DETECTION CIRCUIT AND OPTICAL TOUCH DISPLAY PANEL

TECHNICAL FIELD

The present disclosure relates to the display technology field, and more particularly to an optical touch detection circuit and an optical touch display panel.

BACKGROUND ART

A general touch display panel usually uses a capacitive or resistive touch detection circuit. When a user's finger or a pen touches the display panel, a capacitance or a resistance of a corresponding position in the touch detection circuit is changed. Accordingly, a corresponding touch position can be detected. When a distance between the user and the display panel is increased, the user cannot directly touch the display panel via the finger or the pen and the touch detection circuit cannot detect the touch position expected by the user. Therefore, the conventional capacitive or resistive touch detection circuit is replaced by an optical touch detection circuit in the prior art. The user can use a laser pointer or a light-emitting device instead of the finger or pen to achieve a touch function. However, a signal-to-noise ratio of the optical touch detection circuit in the prior art is low, and thus it is not beneficial for accurately determining a position of an optical touch.

Technical Problem

An objective of the present disclosure is to provide an optical touch detection circuit and an optical touch display panel for solving the technical problem that a signal-to-noise ratio of the optical touch detection circuit in the prior art is low, and thus it is not beneficial for accurately determining a position of an optical touch.

Technical Solution

One embodiment of the present disclosure provides an optical touch detection circuit, including:
  a photosensitive module configured to generate a photoelectric signal; and
  a detection module connected to the photosensitive module, the detection module configured to implement an optical touch function based on the photoelectric signal.

In some embodiment, the photosensitive module includes a first thin film transistor, a control terminal of the first thin film transistor is electrically connected to a first signal input terminal, an input terminal of the first thin film transistor is electrically connected to a second signal input terminal, and an output terminal of the first thin film transistor is electrically connected to the detection module.

In some embodiment, the detection module includes a storage capacitor and a second thin film transistor;
  the storage capacitor includes a first terminal and a second terminal, the first terminal of the storage capacitor is electrically connected to the output terminal of the first thin film transistor, and the second terminal of the storage capacitor is electrically connected to a third signal input terminal; and
  a control terminal of the second thin film transistor is electrically connected to a fourth signal input terminal, an input terminal of the second thin film transistor is electrically connected to the output terminal of the first thin film transistor, and an output terminal of the second thin film transistor is electrically connected to a detection input terminal.

In some embodiment, signals connected to the first signal input terminal and the third signal input terminal are the same signal.

In some embodiment, signals inputted to the first signal input terminal and the second signal input terminal are direct-current voltage signals, a voltage of the signal inputted to the first signal terminal is ranged from −10V to 0V, and a voltage of the second signal input terminal is ranged from 0V to 15V.

In some embodiment, when a signal inputted to the fourth signal input terminal is a first voltage level signal, the second thin film transistor is turned on; when the signal connected to the fourth signal input terminal is a second voltage level signal, the second thin film transistor is turned off; and
  a voltage of the first voltage level signal is ranged from 25 volts to 35 volts, and a voltage of the second voltage level signal is ranged from −15V to 0V.

In some embodiment, a semiconductor material of the first thin film transistor includes an amorphous silicon, and a semiconductor material of the second thin film transistor is a metal oxide.

In some embodiment, the detection module includes a second thin film transistor; and
  a control terminal of the second thin film transistor is electrically connected to the output terminal of the first thin film transistor, an input terminal of the second thin film transistor is electrically connected to a fifth signal input terminal, and an output terminal of the second thin film transistor is electrically connected to a detection input terminal.

In some embodiment, signals connected to the second signal input terminal and the fifth signal input terminal are the same signal.

In some embodiment, a signal inputted to the first signal input terminal and the signal inputted to the second signal input terminal are direct-current voltage signals, a voltage of the signal inputted to the first signal terminal is ranged from −10V to 0V, and a voltage of the second signal input terminal is ranged from 0V to 15V.

In some embodiment, a semiconductor material of the first thin film transistor includes an amorphous silicon, and a semiconductor material of the second thin film transistor is a metal oxide.

One embodiment of the present disclosure further provides an optical touch display panel including an optical touch detection circuit. The optical touch detection circuit includes:
  a photosensitive module configured to generate a photoelectric signal; and
  a detection module connected to the photosensitive module, the detection module configured to implement an optical touch function based on the photoelectric signal.

In some embodiment, the photosensitive module includes a first thin film transistor, a control terminal of the first thin film transistor is electrically connected to a first signal input terminal, an input terminal of the first thin film transistor is electrically connected to a second signal input terminal, and an output terminal of the first thin film transistor is electrically connected to the detection module.

In some embodiment, the detection module includes a storage capacitor and a second thin film transistor;
  the storage capacitor includes a first terminal and a second terminal, the first terminal of the storage capacitor is electrically connected to the output terminal of the first thin film transistor, and the second terminal of the storage capacitor is electrically connected to a third signal input terminal; and a control terminal of the second thin film transistor is electrically connected to a fourth signal input terminal, an input terminal of the second thin film transistor is electrically connected to the output terminal of the first thin film transistor, and an output terminal of the second thin film transistor is electrically connected to a detection input terminal.

In some embodiment, signals connected to the first signal input terminal and the third signal input terminal are the same signal.

In some embodiment, when a signal inputted to the fourth signal input terminal is a first voltage level signal, the second thin film transistor is turned on; when the signal connected to the fourth signal input terminal is a second voltage level signal, the second thin film transistor is turned off; and a voltage of the first voltage level signal is ranged from 25 volts to 35 volts, and a voltage of the second voltage level signal is ranged from −15V to 0V.

In some embodiment, a semiconductor material of the first thin film transistor includes an amorphous silicon, and a semiconductor material of the second thin film transistor is a metal oxide.

In some embodiment, the detection module includes a second thin film transistor; and a control terminal of the second thin film transistor is electrically connected to the output terminal of the first thin film transistor, an input terminal of the second thin film transistor is electrically connected to a fifth signal input terminal, and an output terminal of the second thin film transistor is electrically connected to a detection input terminal.

In some embodiment, signals connected to the second signal input terminal and the fifth signal input terminal are the same signal.

In some embodiment, a semiconductor material of the first thin film transistor includes an amorphous silicon, and a semiconductor material of the second thin film transistor is a metal oxide.

Advantageous Effects

One embodiment of the present disclosure provides an optical touch detection circuit. The optical touch detection circuit includes a photosensitive module and a detection module. The photosensitive module is configured to generate a photoelectric signal. The detection module is connected to the photosensitive module. The detection module is configured to implement an optical touch function based on the photoelectric signal. The photosensitive module is excited by light to generate the corresponding photoelectric signal under the light. The detection module is connected to the photosensitive module. The detection module is configured to convert the photoelectric signal based on the photoelectric signal generated by the photosensitive module and is configured to transfer the converted signal to a detection terminal to implement the touch function of the optical touch detection circuit. The optical touch detection circuit provided by the present disclosure can improve a signal-to-noise ratio of the optical touch detection circuit. This is beneficial for accurately determining a position of an optical touch.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF EMBODIMENTS

Figure 1:
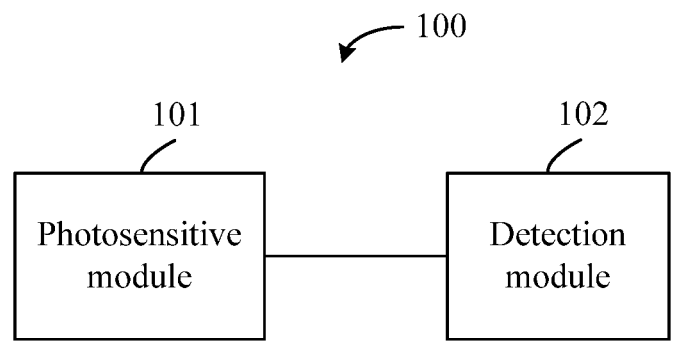
FIG. 1 illustrates a block diagram of an optical touch detection circuit provided by the present disclosure.

The following clearly describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

Thin film transistors in all the embodiments of the present disclosure can be replaced by adopting field-effect transistors or other devices with the same characteristics. Since a source electrode and a drain electrode of each thin film transistor used herein are symmetrical, the source electrode and the drain electrode can be interchangeable. In the embodiments of the present disclosure, in order to distinguish two electrodes of each thin film transistor except a gate electrode, one of the two electrodes is called as a source electrode and the other is called as a drain electrode.

It is noted that the serial number terms "first", "second" and the like in the present disclosure do not denote any order, quantity, or importance, but rather are used to distinguish one element from another. The directional terms "top", "bottom", "left", "right" and the like in the present disclosure are only directions by referring to the accompanying drawings. The positional relationship terms "one side", "the other side" and the like in the present disclosure are only used to distinguish different parts. Accordingly, the serial number terms, the directional terms, and the positional relationship terms are used to explain and understand the present disclosure but are not used to limit the present disclosure. Throughout the entire specification, the same reference numerals denote the same elements. Since a size and a thickness of each component illustrated in the drawings are shown for convenience of description, the present disclosure is not necessarily limited to the illustrated size and thickness of each component.

As shown in FIG. 1, FIG. 1 illustrates a block diagram of an optical touch detection circuit provided by the present disclosure. The optical touch detection circuit 100 includes a photosensitive module 101 and a detection module 102. The photosensitive module 101 is configured to generate a photoelectric signal. The detection module 102 is connected to the photosensitive module 101. The detection module 102 is configured to implement an optical touch function based on the photoelectric signal. Specifically, the photosensitive module 101 is excited by light to generate the corresponding photoelectric signal under the light. The detection module 102 is connected to the photosensitive module 101. The detection module 102 is configured to convert the photoelectric signal based on the photoelectric signal generated by the photosensitive module 101 and is configured to transfer the converted signal to a detection terminal to implement the optical touch function of the optical touch detection circuit 100.

Figure 2:
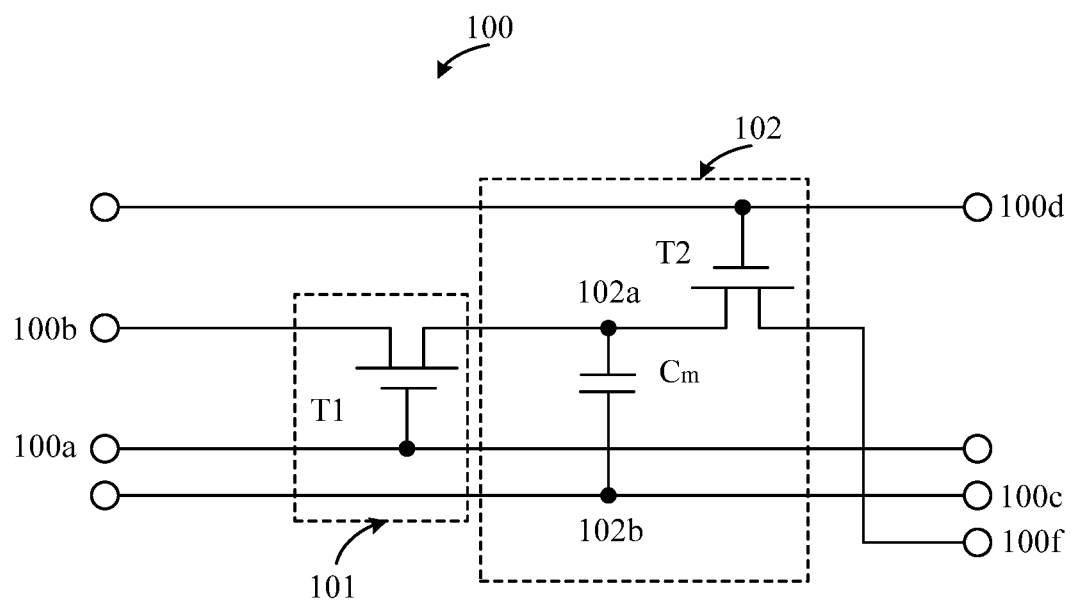
FIG. 2 illustrates a first structural diagram of an optical touch detection circuit provided by the present disclosure.

As shown in FIG. 2, FIG. 2 illustrates a first structural diagram of an optical touch detection circuit provided by the present disclosure.

The optical touch detection circuit 100 includes a photosensitive module 101 and a detection module 102.

The photosensitive module 101 includes a first thin film transistor T1. A control terminal of the first thin film transistor T1 is electrically connected to a first signal input terminal 100a. An input terminal of the first thin film transistor T1 is electrically connected to a second signal input terminal 100b. An output terminal of the first thin film transistor T1 is electrically connected to the detection module 102. The first thin film transistor T1 can be a photosensitive thin film transistor. The photosensitive thin film transistor can convert photons in the light into an electric current, thereby generating the corresponding photoelectric signal. Therefore, the first thin film transistor T1 can generate the photoelectric signal under the light, and can transfer the corresponding photoelectric signal to the detection module 102.

A semiconductor material of the first thin film transistor T1 includes an amorphous silicon. Specifically, the semiconductor material of the first thin film transistor T1 can be a hydrogenated amorphous silicon or a combination of the hydrogenated amorphous silicon and an n-type doped hydrogenated amorphous silicon.

Figure 3:
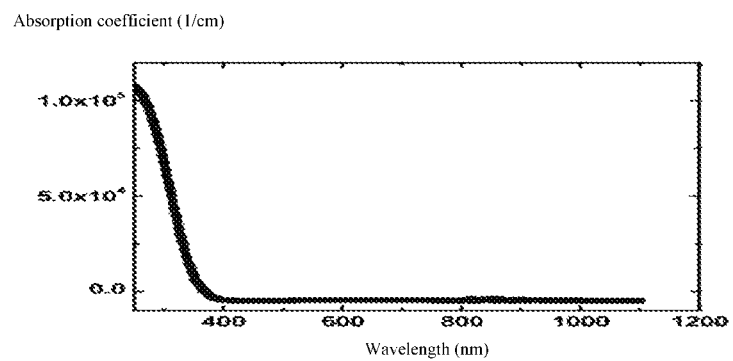
FIG. 3 illustrates an absorption spectrum of metal oxide semiconductor materials at different wavelengths.
Figure 4:
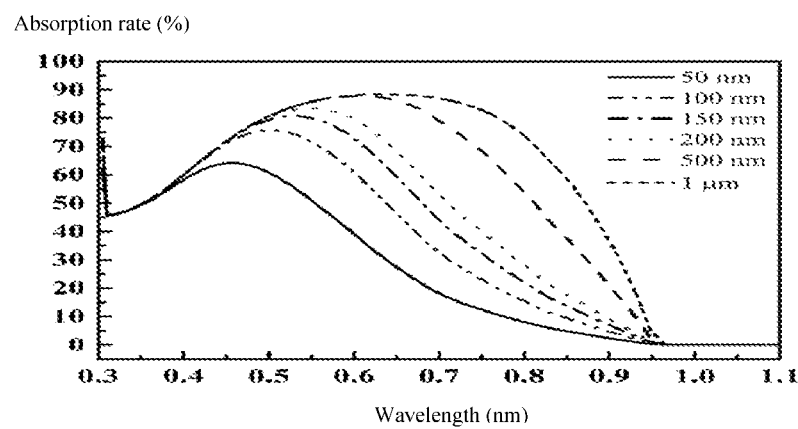
FIG. 4 illustrates an absorption spectrum of amorphous silicon with different thicknesses at different wavelengths.

As shown in FIG. 3 and FIG. 4, FIG. 3 illustrates an absorption spectrum of metal oxide semiconductor materials at different wavelengths, and FIG. 4 illustrates an absorption spectrum of amorphous silicon with different thicknesses at different wavelengths.

Compared with the metal oxide semiconductor materials, amorphous silicon has a stronger ability to absorb visible light. Accordingly, under the condition of the same intensity of the visible light, a thin film transistor using the amorphous silicon as a semiconductor material can generate a larger photoelectric signal, and thus it is beneficial for improving a signal-to-noise ratio of the optical touch detection circuit 100.

A signal inputted to the first signal input terminal 100a is a direct-current voltage signal. Specifically, a voltage of the signal inputted to the first signal terminal 100a is ranged from −10V to 0V. The voltage of the signal inputted to the first signal input terminal 100a can be −10 volts, −8 volts, −6 volts, −5 volts, −4 volts, −2 volts, or 0 volt. A signal inputted to the second signal input terminal 100b is a direct-current. A voltage of the second signal input terminal 100b is ranged from 0V to 15V. The voltage of the signal inputted to the second signal input terminal 100b can be 0V, 5V, 8V, 10V, 12V, or 15V.

As shown in FIG. 2, the detection module 102 includes a storage capacitor Cm and a second thin film transistor T2.

The storage capacitor Cm includes a first terminal 102a and a second terminal 102b. The first terminal 102a of the storage capacitor Cm is electrically connected to the output terminal of the first thin film transistor T1. The second terminal 102b of the storage capacitor Cm is electrically connected to a third signal input terminal 100c. The storage capacitor Cm is configured to accumulate charges generated by the first thin film transistor T1 under a light condition.

The first signal input terminal 100a and the third signal input terminal 100c are respectively connected to different voltage signals. That is, in a practical application, the control terminal of the first thin film transistor T1 and the second terminal 102b of the storage capacitor Cm are respectively connected to different signal wirings. The above-mentioned configuration is beneficial for increasing an amount of accumulated charges of the storage capacitor Cm and reducing crosstalk between the control terminal of the first thin film transistor T1 and the storage capacitor Cm. At the same time, the control terminal of the first thin film transistor T1 and the storage capacitor Cm are respectively connected to different signal wirings. When one of the signal wirings has a fault, the other device can still work normally. This is more beneficial for ensuring reliability of the optical touch detection circuit 100.

Figure 5:
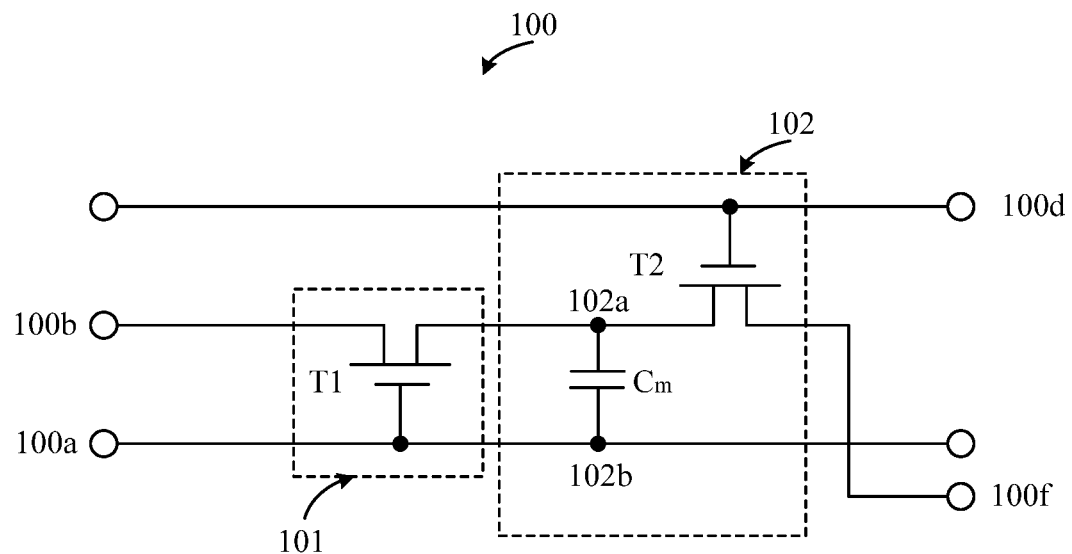
FIG. 5 illustrates a second structural diagram of an optical touch detection circuit provided by the present disclosure.

As shown in FIG. 5, in some embodiments, signals connected to the first signal input terminal 100a and the third signal input terminal 100c can be the same signal. That is, the second terminal 102b of the storage capacitor Cm and the control terminal of the first thin film transistor T1 are connected to the same signal wiring. In FIG. 5, the control terminal of the first thin film transistor T1 and the second terminal 102b of the storage capacitor Cm are together electrically connected to the first signal input terminal 100a. In the present disclosure, the second terminal 102b of the storage capacitor Cm and the control terminal of the first thin film transistor T1 are connected to the same signal wiring, so that it is beneficial for reducing the manufacturing cost of the optical touch detection circuit 100 and beneficial for saving the process time.

A control terminal of the second thin film transistor T2 is electrically connected to a fourth signal input terminal 100d. An input terminal of the second thin film transistor T2 is electrically connected to the output terminal of the first thin film transistor T1. An output terminal of the second thin film transistor T2 is electrically connected to a detection input terminal 100f.

A semiconductor material of the second thin film transistor T2 is a metal oxide. Compared with amorphous silicon materials, the metal oxide semiconductor material has a higher electron mobility and is beneficial for detecting an electrical signal.

Specifically, the semiconductor material of the second thin film transistor T2 can be one or more combinations of an indium gallium zinc oxide (IGZO), a zinc oxide (ZnO), an indium oxide ($In_2O_3$), an indium zinc tin oxide (TIZO), a tin oxide ($SnO_2$), a stannous oxide (SnO), and a cuprous oxide (CuO).

A voltage signal having a positive polarity and a negative polarity which are alternated is inputted to the fourth signal input terminal 100d. That is, the voltage signal having the positive polarity and the negative polarity which are alternated is inputted to the control terminal of the second thin film transistor T2. When the signal inputted to the fourth signal input terminal 100d is a first voltage level signal, the second thin film transistor T2 is turned on. When the signal connected to the fourth signal input terminal 100d is a second voltage level signal, the second thin film transistor T2 is turned off. A voltage of the first voltage level signal is ranged from 25 volts to 35 volts. The voltage of the signal at the first level signal can be 25 volts, 27 volts, 30 volts, 32 volts, or 35 volts. A voltage of the second voltage level signal is ranged from −15V to 0V. The voltage of the second voltage level signal can be −15 volts, −10 volts, −5 volts, or 0 volt. In some embodiments, a pulse period of the signal inputted to the fourth signal input terminal 100d is ranged from 2 microseconds to 5 microseconds. The pulse period of the signal inputted to the fourth signal input terminal 100d can be 2 microseconds, 3 microseconds, 4 microseconds, or 5 microseconds.

When the signal inputted to the fourth signal input terminal 100d is the first voltage level signal, the second thin film transistor T2 is turned on. The charges stored in the storage capacitor Cm reach the detection input terminal 100f via the input terminal and the output terminal of the second thin film transistor T2. The charges stored in the storage capacitor Cm are detected by an external circuit, thereby implementing the touch function of the optical touch detection circuit 100.

The detection module 102 of the present disclosure includes the storage capacitor Cm and the second thin film transistor T2. The storage capacitor Cm stores charges generated by the first thin film transistor T1. When the second thin film transistor T2 is turned on, the charges stored in the storage capacitor Cm reach the detection input terminal 100f via the second thin film transistor T2 and are detected by the external circuit. A conventional optical touch detection circuit directly detects a photoelectric signal generated by the photosensitive thin film transistor. In the present disclosure, the photoelectric signal generated by the first thin film transistor T1 is stored in the storage capacitor Cm first. When the second thin film transistor T2 is turned on, the charges of the storage capacitor Cm is detected by the detection input terminal 100f. Therefore, compared with the conventional optical touch detection circuit, the optical touch detection circuit 100 provided by the present disclosure can improve a signal-to-noise ratio of the optical touch detection circuit 100, thereby increasing sensitivity of an optical touch. This is beneficial for accurately determining a position of the optical touch.

A driving method of the optical touch detection circuit 100 provided in FIGS. 2 and 5 includes a sensing stage, a charge accumulation stage, and a charge detection stage.

In the light sensing stage, under a light condition, the control terminal of the first thin film transistor T1 is electrically connected to the first signal input terminal 100a. The first signal input terminal 100a provides a first power signal to the control terminal of the first thin film transistor T1. The input terminal of the first thin film transistor T1 is electrically connected to the second signal input terminal 100b. The second signal input terminal 100b provides a second power signal to the input terminal of the first thin film transistor T1. The first thin film transistor T1 is turned on, and the semiconductor material of the first thin film transistor T1 converts photons in light into electric charges. That is, the first thin film transistor T1 generates charges in a light environment.

In the charge accumulation stage, the first thin film transistor T1 generates the charges in the light environment and transfers the charges to the storage capacitor Cm. The storage capacitor Cm accumulates the charges generated by the first thin film transistor T1 in a light environment.

In the charge detection stage, the control terminal of the second thin film transistor T2 is electrically connected to the fourth signal input terminal 100d. The fourth signal input terminal 100d provides a fourth power signal to the control terminal of the second thin film transistor T2. The input terminal of the second thin film transistor T2 is electrically connected to the storage capacitor Cm. The output terminal of the second thin film transistor T2 is electrically connected to the detection input terminal 100f. When the fourth power signal is the first voltage level signal, the second thin film transistor T2 is turned on. The charges accumulated in the storage capacitor Cm pass through the input terminal and the output terminal of the second thin film transistor T2 and are detected by the detection input terminal 100f.

In the driving method of the optical touch detection circuit 100 provided by the present disclosure, the charges generated by the first thin film transistor T1 of the photosensitive module 101 are transferred to the detection module 102. The storage capacitor Cm of the detection module 102 stores the charges generated by the first thin film transistor T1. When the second thin film transistor T2 is turned on, the charges accumulated in the storage capacitor Cm are detected by the detection input terminal 100f, thereby implementing touch control. The driving method of the optical touch detection circuit 100 provided by the present disclosure can increase the signal-to-noise ratio of the optical touch detection circuit 100, thereby increasing the sensitivity of the optical touch. This is beneficial for accurately determining the position of the optical touch.

Figure 6:
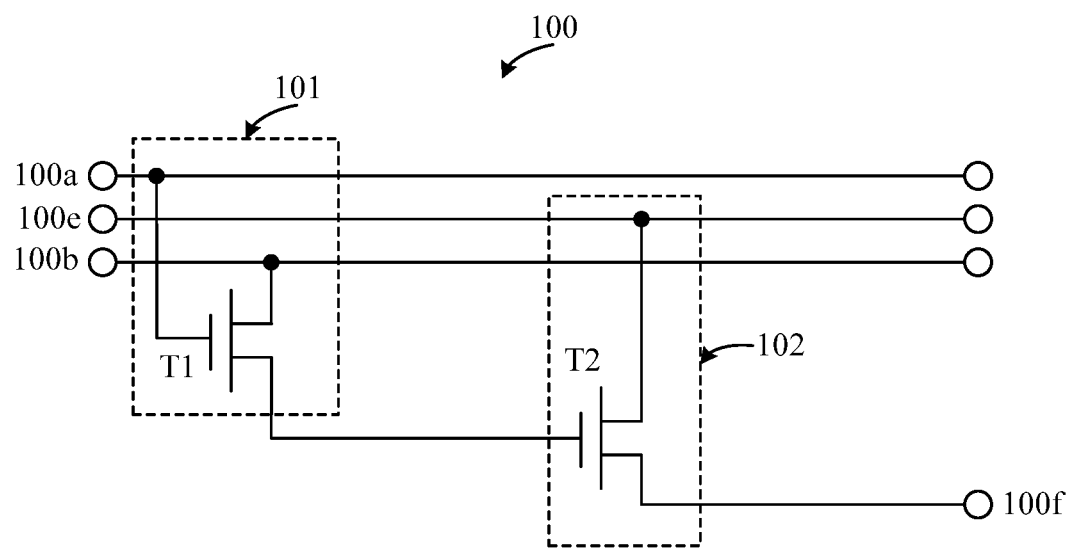
FIG. 6 illustrates a third structural diagram of an optical touch detection circuit provided by the present disclosure.

As shown in FIG. 6, FIG. 6 illustrates a third structural diagram of an optical touch detection circuit provided by the present disclosure. A difference between the third structure of the optical touch detection circuit 100 provided by the present disclosure and the first structure of the optical touch detection circuit 100 is that the detection module 102 includes a second thin film transistor T2.

A control terminal of the second thin film transistor T2 is electrically connected to the output terminal of the first thin film transistor T1. An input terminal of the second thin film transistor T2 is electrically connected to a fifth signal input terminal 100e. An output terminal of the second thin film transistor T2 is electrically connected to the detection input terminal 100f.

The first thin film transistor T1 is a photosensitive thin film transistor. The photosensitive thin film transistor can convert photons in light into a corresponding photoelectric signal. Therefore, the first thin film transistor T1 can generate the photoelectric signal under the light and transfer the corresponding photoelectric signal to the control terminal of the second thin film transistor T2. At this time, the second thin film transistor T2 is turned on. That is, in a light environment, the first thin film transistor T1 generates the photoelectric signal to control the second thin film transistor T2 to be turned on. The signal at the input terminal of the second thin film transistor T2 is transferred to the detection input terminal 100f. The above-mentioned arrangement is beneficial for amplifying the photoelectric signal generated by the first thin film transistor T1, thereby improving the signal-to-noise ratio of the optical touch detection circuit 100.

As shown in FIG. 6, the input terminal of the first thin film transistor T1 is electrically connected to the second signal input terminal 100b. The input terminal of the second thin film transistor T2 is electrically connected to the fifth signal input terminal 100e. The second signal input terminal and the fifth signal input terminal are respectively connected to different voltage signals. That is, in practical applications, the input terminal of the first thin film transistor T1 and the input terminal of the second thin film transistor T2 are respectively connected to different signal wirings. The above-mentioned arrangement is beneficial for reducing the crosstalk problem between the first thin film transistor T1 and the second thin film transistor T2. At the same time, the input terminal of the first thin film transistor T1 and the input terminal of the second thin film transistor T2 are respectively connected to different signal wirings. When one of the signal wirings has a fault, the other device can still work normally. This is more beneficial for ensuring reliability of the optical touch detection circuit 100.

Figure 7:
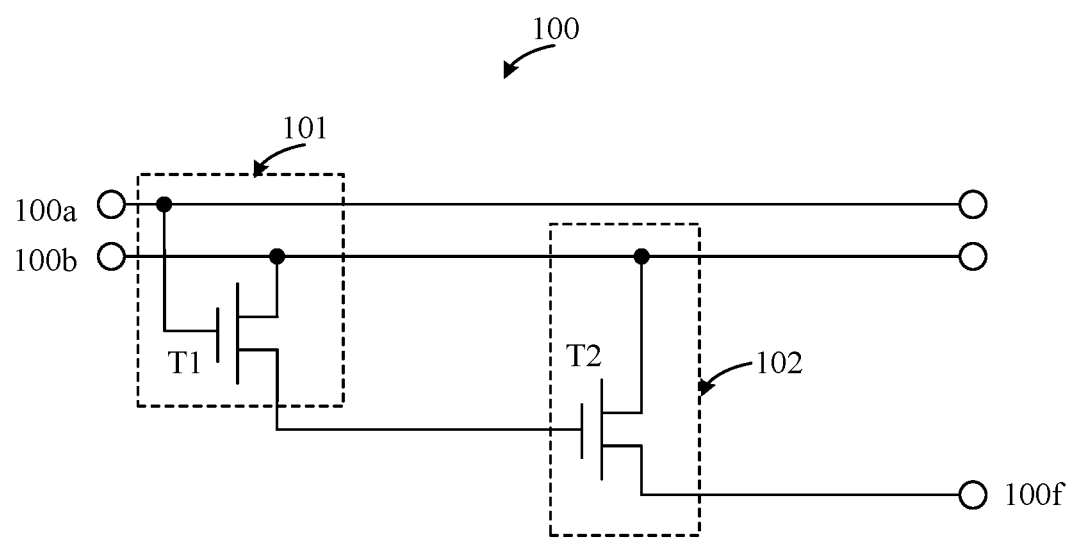
FIG. 7 illustrates a fourth structural diagram of an optical touch detection circuit provided by the present disclosure.

As shown in FIG. 7, FIG. 7 illustrates a fourth structural diagram of an optical touch detection circuit 100 provided by the present disclosure. In some embodiments, signals connected to the second signal input terminal 100b and the fifth signal input terminal 100f can be the same signal. That is, the input terminal of the second thin film transistor T2 and the input terminal of the first thin film transistor T1 are connected to the same signal wiring. In FIG. 7, the input terminal of the second thin film transistor T2 and the input terminal of the first thin film transistor T1 are electrically connected to the second signal input terminal 100b. In the present disclosure, the input terminal of the second thin film transistor T2 and the input terminal of the first thin film transistor T1 are connected to the same signal wiring, so that it is beneficial for reducing the manufacturing cost of the optical touch detection circuit 100 and beneficial for saving manufacturing time.

Other elements in the third structure of the optical touch detection circuit 100 and the fourth structure of the optical touch detection circuit 100 in the present disclosure are the same those in the first structure of the optical touch detection circuit 100 and the second structure of the optical touch detection circuit, and thus they are not repeated herein.

A driving method of the optical touch detection circuit 100 provided in FIGS. 6 and 7 includes a sensing stage and a detection stage.

In the light sensing stage, under a light condition, the control terminal of the first thin film transistor T1 is electrically connected to the first signal input terminal 100a. The first signal input terminal 100a provides a first power signal to the control terminal of the first thin film transistor T1. The input terminal of the first thin film transistor T1 is electrically connected to the second signal input terminal 100b. The second signal input terminal 100b provides a second power signal to the input terminal of the first thin film transistor T1. The first thin film transistor T1 is turned on, and the semiconductor material of the first thin film transistor T1 converts photons into a photoelectric signal.

In the charge accumulation stage, the first thin film transistor T1 generates the photoelectric signal in a light environment and transfers the photoelectric signal to the control terminal of the second thin film transistor T2. A voltage at the control terminal of the second thin film transistor T2 is increased, and thus the second thin film transistor T2 is turned on. A signal at the input terminal of the second thin film transistor T2 is transferred to the detection input terminal 100f via the output terminal of the second thin film transistor T2 and is detected by the detection input terminal 100f.

In the driving method of the optical touch detection circuit 100 provided by the present disclosure, a photocurrent generated by the first thin film transistor T1 of the photosensitive module 101 is configured to control the second thin film transistor T2 of the detection module 102 to be turned on. When the second thin film transistor T2 is turned on, the signal at the input terminal of the second thin film transistor T2 is detected by the detection input terminal 100f, thereby implementing touch control. In the driving method of the optical touch detection circuit 100 provided by the present disclosure, the detection terminal directly detects the signal at the input terminal of the second thin film transistor T2 instead of directly detecting the photoelectric signal at the first thin film transistor T1. A signal intensity of the input terminal of the second thin film transistor T2 can be set to be greater than a signal intensity of the photoelectric signal of the first thin film transistor T1. Accordingly, the optical touch detection circuit 100 in the present disclosure can have a function of amplifying the photoelectric signal and can improve the signal-to-noise ratio of the optical touch detection circuit 100, thereby increasing the sensitivity of an optical touch. This is beneficial for accurately determining a position of the optical touch.

The present disclosure provides an optical touch detection circuit. The optical touch detection circuit includes a photosensitive module and a detection module. The photosensitive module is configured to generate a photoelectric signal. The detection module is connected to the photosensitive module. The detection module is configured to implement an optical touch function based on the photoelectric signal. The photosensitive module is excited by light to generate the corresponding photoelectric signal under the light. The detection module is connected to the photosensitive module. The detection module is configured to convert the photoelectric signal based on the photoelectric signal generated by the photosensitive module and is configured to transfer the converted signal to a detection terminal to implement the touch function of the optical touch detection circuit. The optical touch detection circuit provided by the present disclosure can improve a signal-to-noise ratio of the optical touch detection circuit. This is beneficial for accurately determining a position of an optical touch.

Figure 8:
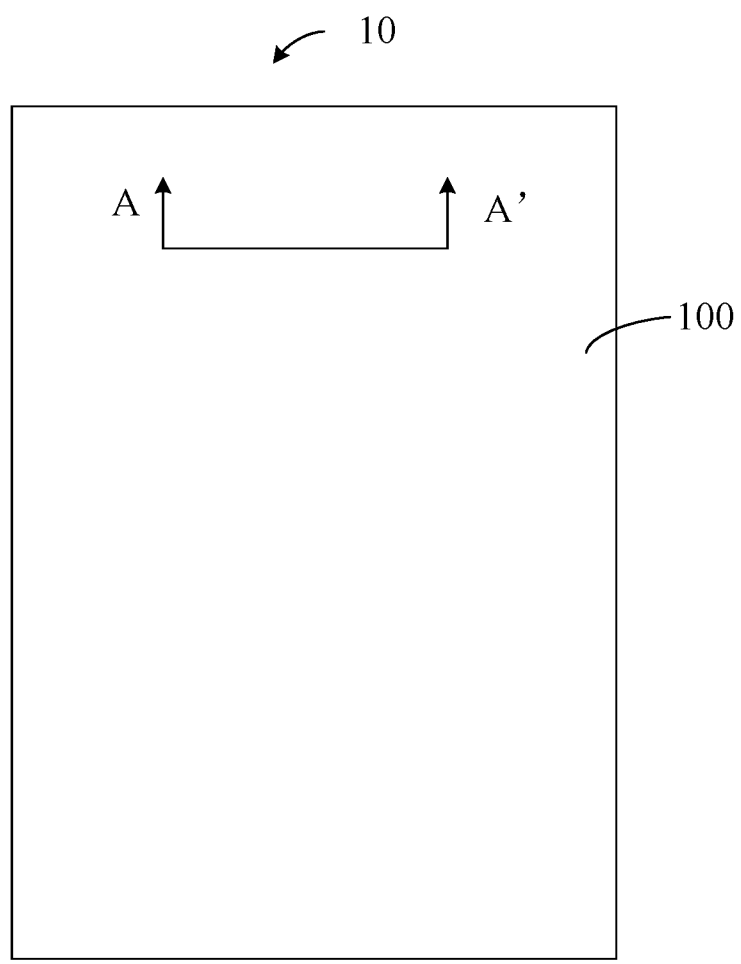
FIG. 8 illustrates a structural diagram of an optical touch display panel provided by the present disclosure.

The present disclosure further provides a display panel. As shown in FIG. 8, FIG. 8 illustrates a structural diagram of an optical touch display panel provided by the present disclosure. The optical touch display panel 10 includes the optical touch detection circuit 100 described above.

Figure 9:
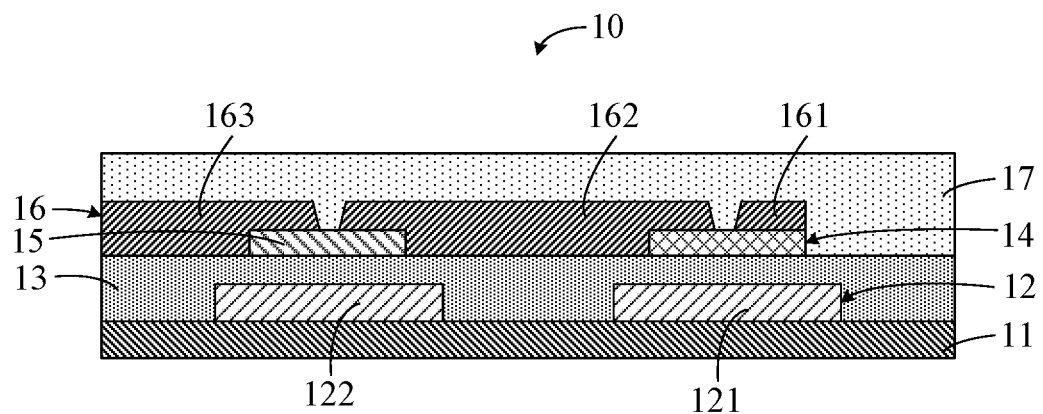
FIG. 9 illustrates a cross-sectional view of an optical touch display panel along a line AA' provided by a first embodiment of the present disclosure.

Please refer to FIG. 9 in combination with FIG. 5. FIG. 9 illustrates a cross-sectional view of an optical touch display panel 10 along a line AA' provided by a first embodiment of the present disclosure.

The optical touch display panel 10 provided by the first embodiment of the present disclosure includes a substrate 11, a first metal layer 12, a first insulating layer 13, a first semiconductor layer 14, a second semiconductor layer 15, a second metal layer 16, and a first passivation layer 17.

The first metal layer 12 is positioned on one side of the substrate 11. The first metal layer 12 is a patterned metal layer. The first metal layer 12 includes a first subpart 121 and a second subpart 122. The first subpart 121 and the second subpart 122 are respectively served as the control terminal of the first thin film transistor T1 and the control terminal of the second thin film transistor T2. The first subpart 121 can be connected to the first signal input terminal 100a. That is, the control terminal of the first thin film transistor T1 is electrically connected to the first signal input terminal 100a. The second subpart 122 can be connected to the fourth signal input terminal 100d. That is, the control terminal of the second thin film transistor T2 is electrically connected to the fourth signal input terminal 100d.

The first insulating layer is positioned on one side of the first metal layer 12 away from the substrate 11. The first insulating layer 13 covers the first subpart 121 and the second subpart 122 of the first metal layer 12.

The first semiconductor layer 14 and the second semiconductor layer 15 are positioned on one side of the first insulating layer 13 away from the first metal layer 12. The first semiconductor layer 14 and the second semiconductor layer 15 are arranged adjacent to each other.

The first semiconductor layer 14 is equal to an active layer of the first thin film transistor T1. A material of the first semiconductor layer 14 includes an amorphous silicon. For example, the material of the first semiconductor layer 14 can be a hydrogenated amorphous silicon. The hydrogenated amorphous silicon has good absorption effect on visible light and can convert the visible light into a corresponding electrical signal with a greater efficiency.

In some embodiments, the material of the first semiconductor layer 14 can include a hydrogenated amorphous silicon and an n-doped hydrogenated amorphous silicon (not shown in FIG. 9). The n-doped hydrogenated amorphous silicon is positioned at two ends of the hydrogenated amorphous silicon. The n-doped hydrogenated amorphous silicon is connected to the hydrogenated amorphous silicon and the second metal layer 16. Compared with hydrogenated amorphous silicon, the n-doped hydrogenated amorphous silicon has better conductivity. Accordingly, the first semiconductor layer 14 including the hydrogenated amorphous silicon and the n-doped hydrogenated amorphous silicon can reduce a barrier between the hydrogenated amorphous silicon and a metal layer. It is beneficial for transferring the photoelectric signal generated by the first thin film transistor T1 and improving the signal-to-noise ratio of the optical touch circuit.

The second semiconductor layer 15 is equal to an active layer of the second thin film transistor T2. A material of the second semiconductor layer 15 includes a metal oxide. Specifically, the material of the second semiconductor layer 15 can be one or more combinations of an IGZO, a ZnO, an $In_2O_3$, a TIZO, an $SnO_2$, an SnO, and a CuO. Compared with the amorphous silicon, the metal oxide semiconductor material has a higher electron mobility and is beneficial for detecting an electrical signal.

The second metal layer 16 is positioned on one side of the first semiconductor layer 14 and the second semiconductor layer 15 away from the first insulating layer 13. The second metal layer 16 is a patterned metal layer. The second metal layer 16 includes a third subpart 161, a fourth subpart 162, and a fifth subpart 163. The third subpart 161 is connected to the first semiconductor layer 14 layer. The third subpart 161 is equivalent to the input terminal of the first thin film transistor T1. One terminal of the fourth subpart 162 is connected to the first semiconductor layer 14, and the other terminal of the fourth subpart 162 is connected to the second semiconductor layer 15. The fourth subpart 162 is connected to the first semiconductor layer 14 and the second semiconductor layer 15 is equal to the output terminal of the first thin film transistor T1, and is electrically connected to the input terminal of the second thin film transistor T2. One terminal of the fifth subpart 163 is connected to the second semiconductor layer 15 layer, and the other terminal of the fifth subpart 163 is connected to a detection signal wiring (not shown in FIG. 9). The fifth subpart 163 is connected to the second semiconductor layer 15 and the detection signal wiring, is equal to the output terminal of the second thin film transistor T2, and is electrically connected to the detection input terminal 100f. The third subpart 161 can be connected to the second signal input terminal 100b. That is, the input terminal of the first thin film transistor T1 is electrically connected to the second signal input terminal 100b. The fifth subpart 163 is connected to the detection input terminal 100f. That is, the output terminal of the second thin film transistor T2 is electrically connected to the detection input terminal 100f.

An overlapping area exists between a projection of the first subpart 121 of the first metal layer 12 on the substrate and a projection of the fourth subpart 162 of the second metal layer 16 on the substrate. The above-mentioned overlapping area is the storage capacitor Cm of the optical touch detection circuit 100. A portion of the first subpart 121 corresponding to the overlapping area is equal to one plate of the storage capacitor Cm, and a portion of the fourth subpart 162 corresponding to the overlapping area is equal to the other plate of the storage capacitor Cm. That is, the portion of the first subpart 121 corresponding to the overlapping area and connected to a remaining portion of the first subpart 121 is equal to the control terminal of the first thin film transistor T1 electrically connected to the second terminal 102b of the storage capacitor Cm. That is, the portion of the fourth subpart 162 corresponding to the overlapping area and connected to a remaining portion of the fourth subpart 162 is equal to the output terminal of the first thin film transistor T1 electrically connected to the first terminal 102a of the storage capacitor Cm.

The first passivation layer 17 is positioned on one side of the second metal layer 16 away from the first insulating layer 13. The first passivation layer 17 covers the second metal layer 16.

It can be understood that the optical touch display panel 10 provided by the present disclosure can be an out-cell optical touch display panel 10. That is, the above-mentioned film layers can be formed on a light-emitting side of an encapsulation layer of the optical touch display panel 10.

The optical touch display panel 10 provided by the present disclosure can also be an in-cell optical touch display panel 10. That is, the above-mentioned film structure can be formed together with an array substrate of the optical touch display panel 10. Forming the above-mentioned film structure of the present disclosure together with the array substrate of the optical touch display panel 10 is beneficial for saving the manufacturing process and shortening the manufacturing time. At the same time, forming the optical touch detection circuit 100 together with other signal wirings in the array substrate is beneficial for implementing the optical touch display panel 10 to be thin and light and beneficial for forming the optical touch display panel 10 which is ultra-thin.

Figure 10:
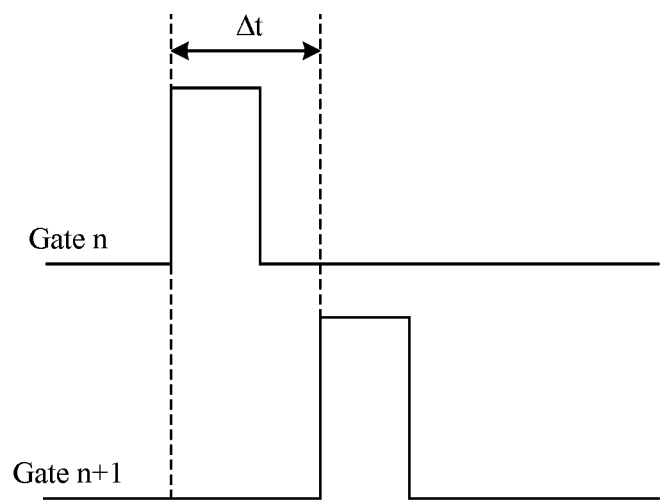
FIG. 10 illustrates a timing diagram of a signal inputted to a fourth signal input terminal of an optical touch detection circuit provided by the present disclosure.

When the optical touch display panel 10 is an in-cell optical touch display panel 10, the control terminal of the second thin film transistor T2 can be connected to pixel units together. That is, in the display panel 10, the control terminal of the second thin film transistor T2 in each row is controlled by the same scan line. Specifically, please refer to FIG. 10 in combination with FIG. 5. FIG. 10 illustrates a timing diagram of the signal inputted to the fourth signal input terminal 100$d$ of the optical touch detection circuit 100 provided by the present disclosure. The control terminal of the second thin film transistor T2 is electrically connected to the fourth signal input terminal 100$d$. The signal inputted to the fourth signal input terminal 100$d$ includes a first voltage level signal and a second voltage level signal. The first voltage level signal is a high voltage level signal. The second voltage level signal is a low voltage level signal. When the signal inputted to the fourth signal input terminal 100$d$ is the first voltage level, the second thin film transistor T2 is turned on. When the signal inputted to the fourth signal input terminal 100$d$ is the second voltage level signal, the second thin film transistor T2 is turned off. A pulse period Δt of the signal inputted to the fourth signal input terminal 100$d$ is ranged from 2 microseconds to 5 microseconds. Δt can be 2 microseconds, 3 microseconds, 4 microseconds, or 5 microseconds. The pulse period Δt of the signal inputted to the fourth signal input terminal 100$d$ is equal to a refresh frequency of the touch display panel 10. The pulse period is greater than duration of the first voltage level signal. The above-mentioned arrangement provides a certain buffer time for the second thin film transistor T2 to avoid signal crosstalk when an nth scan line (corresponding to Gate n in FIG. 10) corresponding to the second thin film transistor T2 is not completely turned off but an (n+1)th scan line (corresponding to Gate n+1 in FIG. 10) corresponding to the second thin film transistor T2 is turned on. Accordingly, setting the pulse period to be greater than duration of the first voltage level signal in the present disclosure can avoid a situation that the signal crosstalk exists in the optical touch display panel 10.

In some embodiments, the pulse period can be equal to the duration of the first voltage level signal. The preset disclosure does not specifically limit the pulse period and the duration of the first voltage level signal.

Figure 11:
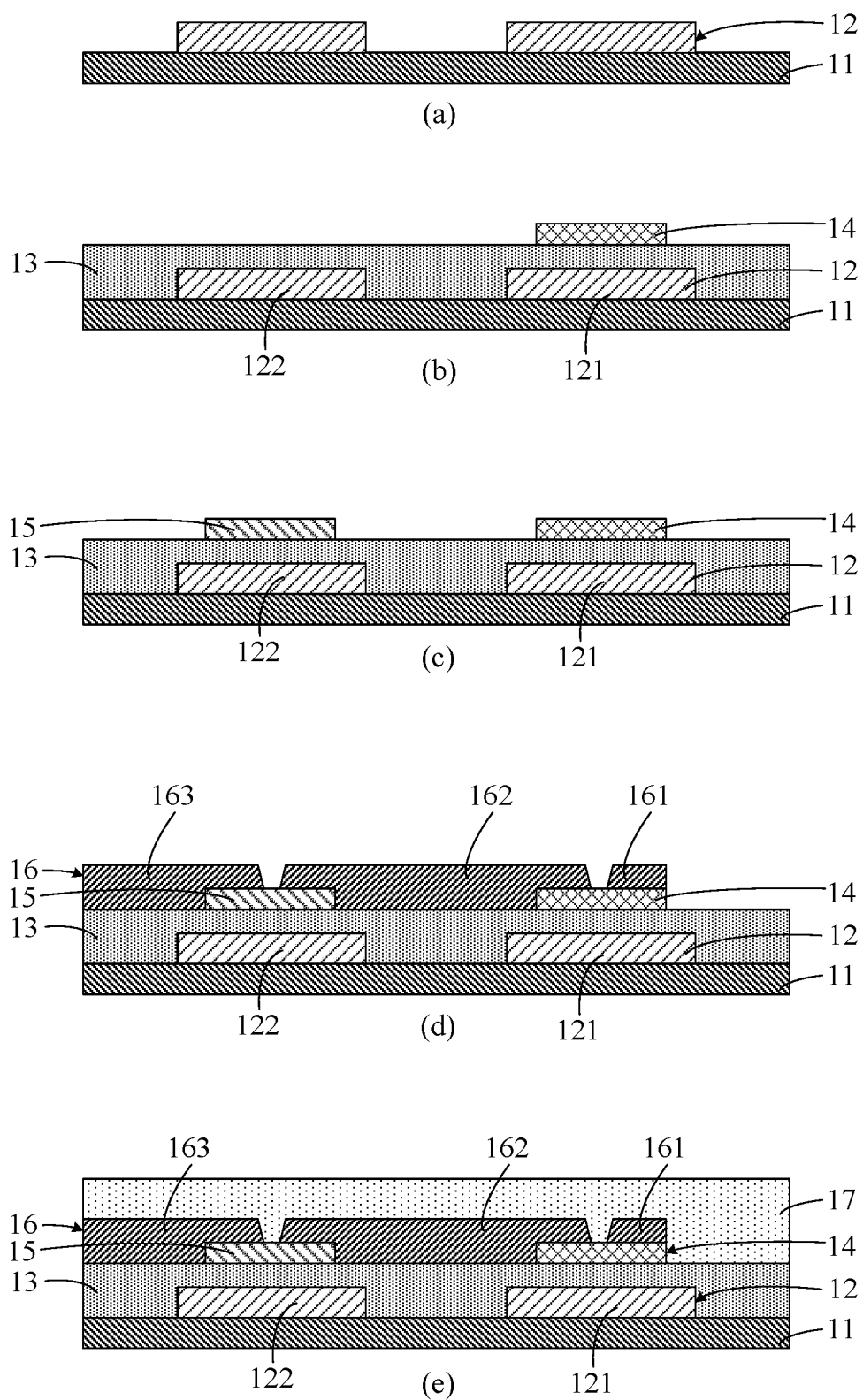
FIG. 11 illustrates a schematic diagram of a manufacturing method of an optical touch display panel provided by a first embodiment of the present disclosure.

As shown in FIG. 11, FIG. 11 illustrates a schematic diagram of a manufacturing method of an optical touch display panel provided by a first embodiment of the present disclosure. The manufacturing method of the optical touch display panel 10 of the present disclosure includes the following steps.

As shown in a structure of FIG. 11($a$), a first metal layer 12 is formed on a substrate 11. The first metal layer 12 is patterned to form a first subpart 121 and a second subpart 122.

Specifically, the substrate 11 can be a substrate 11 using various materials. For example, the substrate 11 can be a rigid substrate or a flexible substrate. A material of the substrate 11 can be selected according to actual requirements of the optical touch display panel 10. Before the first metal layer 12 is formed, other film layers, such as a buffer layer, a flat layer, or a conductive layer, can be formed on the substrate 11 according to the requirements of the optical touch display panel 10.

A material of the first metal layer 12 can be at least one of copper (Cu), molybdenum (Mo), or aluminum (Al). A process of forming the first metal layer 12 can be an electrochemical deposition process, a chemical vapor deposition process, or a metal layer sputtering process. The above-mentioned method of forming the first metal layer 12 can be selected according to the requirements of the optical touch display panel 10 and is not limited herein. After the first metal layer 12 is formed, the first metal layer 12 can be patterned by a wet etching process to form the first subpart 121 and the second subpart 122.

As shown in a structure of FIG. 11($b$), a first insulating layer 13 is formed on one surface of the first metal layer 12. A first semiconductor layer 14 is formed on one surface of the first insulating layer 13.

Specifically, after the first metal layer 12 is formed, the first insulating layer 13 can be formed on one side of the first metal layer 12 away from the substrate by a chemical vapor deposition method. In one implementation of the embodiment of the present disclosure, a material of the first insulating layer 13 is a silicon nitride ($Si_xN_y$). Raw materials used to prepare the first insulating layer 13 by the chemical vapor deposition include a monosilane ($SiH_4$) and an ammonia ($NH_3$). $SiH_4$ and $NH_3$ react on the surface of the first metal layer 12, and generated $Si_xN_y$ solids are deposited on the surface of the first metal layer 12 to form the first insulating layer 13.

After the first insulating layer 13 is formed, a hydrogenated amorphous silicon thin film layer is formed on one surface of the first insulating layer 13. The hydrogenated amorphous silicon thin film layer is patterned to form a first semiconductor layer 14.

As shown in a structure of FIG. 11($c$), a second semiconductor layer 15 is formed on the first insulating layer 13.

Specifically, a metal oxide semiconductor material can be deposited on the first insulating layer 13 by a physical vapor deposition method or a chemical vapor deposition method to form a metal oxide semiconductor film layer. The metal oxide semiconductor film layer is served as the second semiconductor layer 15. The second semiconductor layer 15 and the first semiconductor layer 14 are arranged adjacent to each other.

As shown in a structure of FIG. 11($d$), a second metal layer 16 is formed on the first semiconductor layer 14 and the second semiconductor layer 15. The second metal layer 16 is patterned to form a third subpart 161, a fourth subpart 162, and a fifth subpart 163.

A material of the second metal layer 16 can be at least one of Cu, Mo, or Al. A process of forming the second metal layer 16 can be an electrochemical deposition process, a chemical vapor deposition process, or a metal layer sputtering process. The above-mentioned method of forming the second metal layer 16 can be selected according to the requirements of the optical touch display panel 10 and is not limited herein. After the second metal layer 16 is formed, the second metal layer 16 can be patterned by a wet etching process to form the third subpart 161, the fourth subpart 162, and the fifth subpart 163.

As shown in a structure 116 of FIG. 11($e$), a first passivation layer 17 is formed on one surface of the second metal layer 16.

Specifically, a material of the first passivation layer 17 can be a $Si_xN_y$ or a silicon oxide ($SiO_x$). The first passivation layer 17 can be formed by a chemical vapor deposition process.

Figure 12:
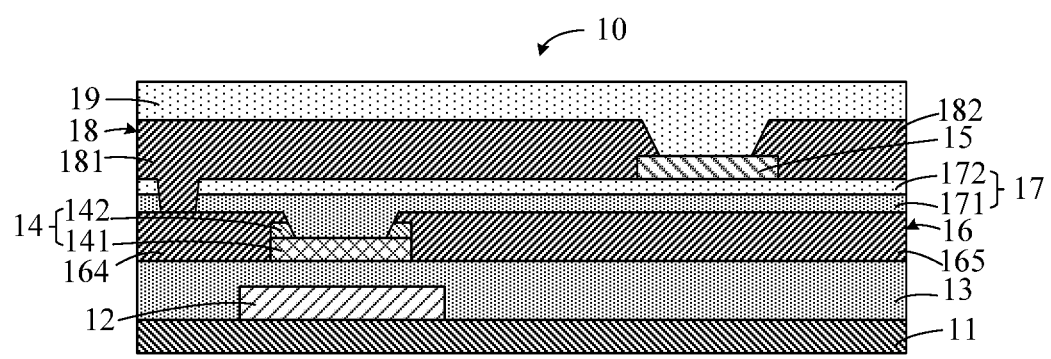
FIG. 12 illustrates a cross-sectional view of an optical touch display panel along a line AA' provided by a second embodiment of the present disclosure.

Please refer to FIG. 12 in combination with FIG. 7. FIG. 12 illustrates a cross-sectional view of an optical touch display panel 10 along a line AA' provided by a second embodiment of the present disclosure.

The display panel 10 provided by the second embodiment of the present disclosure includes a substrate 11, a first metal layer 12, a first insulating layer 13, a first semiconductor layer 14, a second semiconductor layer 15, a second metal layer 16, a first The passivation layer 17, a third metal layer 18, and a second passivation layer 19.

The first metal layer 12 is positioned on one side of the substrate 11. The first metal layer 12 is a patterned metal layer. The first metal layer 12 is served as the control terminal of the first thin film transistor T1. The first metal layer 12 can be connected to the first signal input terminal 100*a*. That is, the control terminal of the first thin film transistor T1 is electrically connected to the first signal input terminal 100*a*.

The first insulating layer 13 is positioned on one side of the first metal layer 12 away from the substrate 11. The first insulating layer 13 covers the first metal layer 12.

The first semiconductor layer 14 is positioned on one side of the first insulating layer 13 away from the first metal layer 12. The first semiconductor layer 14 is served as an active layer of the first thin film transistor T1. The first semiconductor layer 14 includes a first semiconductor sublayer 141 and a second semiconductor sublayer 142. The first semiconductor sublayer 141 is positioned on one side of the first insulating layer 13 away from the first metal layer 12. The second semiconductor sublayer 142 is positioned at two ends of the first semiconductor sublayer 141, and the second semiconductor sublayer 142 is positioned on one side of the first semiconductor sublayer 141 away from the first insulating layer 13. A material of the first semiconductor sublayer 141 can be a hydrogenated amorphous silicon. The hydrogenated amorphous silicon has good absorption effect on visible light and can convert the visible light into a corresponding electrical signal with a greater efficiency. A material of the second semiconductor sub-layer 142 can be an n-doped hydrogenated amorphous silicon. Compared with the hydrogenated amorphous silicon, the n-doped hydrogenated amorphous silicon has better conductivity. The n-doped hydrogenated amorphous silicon can reduce a barrier between the hydrogenated amorphous silicon and a metal layer. It is beneficial for transferring the photoelectric signal generated by the first thin film transistor T1 and improving the signal-to-noise ratio of the optical touch circuit.

The second metal layer 16 is positioned at two ends of the first semiconductor layer 14, and the second metal layer 16 is positioned on one side of the first insulating layer 13 away from the first metal layer 12. The second metal layer 16 includes a sixth subpart 164 and a seventh subpart 165. The sixth subpart 164 is equal to the input terminal of the first thin film transistor T1. The sixth subpart 164 can be connected to the second signal input terminal 100*b*. That is, the input terminal of the first thin film transistor T1 is electrically connected to the second signal input terminal 100*b*. A projection of the seventh subpart 165 on the substrate 11 covers a projection of the second semiconductor layer 15 on the substrate 11. A portion of the seventh subpart 165 corresponding to the second semiconductor layer 15 is equal to the input terminal of the second thin film transistor T2. A remaining part of the seventh subpart 165 is equivalent to the output terminal of the first thin film transistor T1. Therefore, disposing the seventh subpart 165 is equal to disposing the output terminal of the first thin film transistor T1 to be electrically connected to the control terminal of the second thin film transistor T2.

The first passivation layer 17 is positioned on one side of the second metal layer 16 away from the first insulating layer 13. The first passivation layer 17 includes a first passivation sublayer 171 and a second passivation sublayer 172 that are stacked up. The first passivation sublayer 171 is positioned on one side of the second metal layer 16 away from the first insulating layer 13. The first passivation sublayer 171 contacts the first semiconductor layer 14 through a via. The second passivation sublayer 172 is positioned on one side of the first passivation sub-layer 171 away from the second metal layer 16.

The second semiconductor layer 15 is positioned on one side of the second passivation sublayer 172 away from the first passivation sublayer 171. The second semiconductor layer 15 is equal to an active layer of the second thin film transistor T2. A material of the second semiconductor layer 15 includes a metal oxide. Specifically, the material of the second semiconductor layer 15 can be one or more combinations of an IGZO, a ZnO, an $In_2O_3$, a TIZO, an $SnO_2$, an SnO, and a CuO. Compared with the amorphous silicon material, the metal oxide semiconductor material has a higher electron mobility and is beneficial for detecting an electrical signal.

The third metal layer 18 is positioned on one side of the second passivation sublayer 172 away from the first passivation sublayer 171. The third metal layer 18 includes an eighth subpart 181 and a ninth subpart 182. The eighth subpart 181 and the ninth subpart 182 are respectively positioned at two ends of the second semiconductor layer 15. The eighth subpart 181 is connected to one end of the second semiconductor layer 15. The eighth subpart 181 can be connected to the fifth signal input terminal 100*e*. That is, the input terminal of the second thin film transistor T2 is electrically connected to the fifth signal input terminal 100*e*. The eighth subpart 181 is connected to the sixth subpart 164 through a via. The eighth subpart 181 and the sixth subpart 164 can be inputted by the same signal. That is, signals connected to the second signal input terminal 100*b* and the fifth signal input terminal 100*e* are the same signal. The ninth subpart 182 is connected to one end of the second semiconductor layer 15. The second semiconductor layer 15 connected to the ninth subpart 182 is equal to the output terminal of the second thin film transistor T2 electrically connected to the detection input terminal 100*f*.

The second passivation layer 19 is positioned on one side of the third metal layer 18 away from the first passivation layer 17. The second passivation layer 19 contacts the second semiconductor layer 15 through a via.

Figure 13:
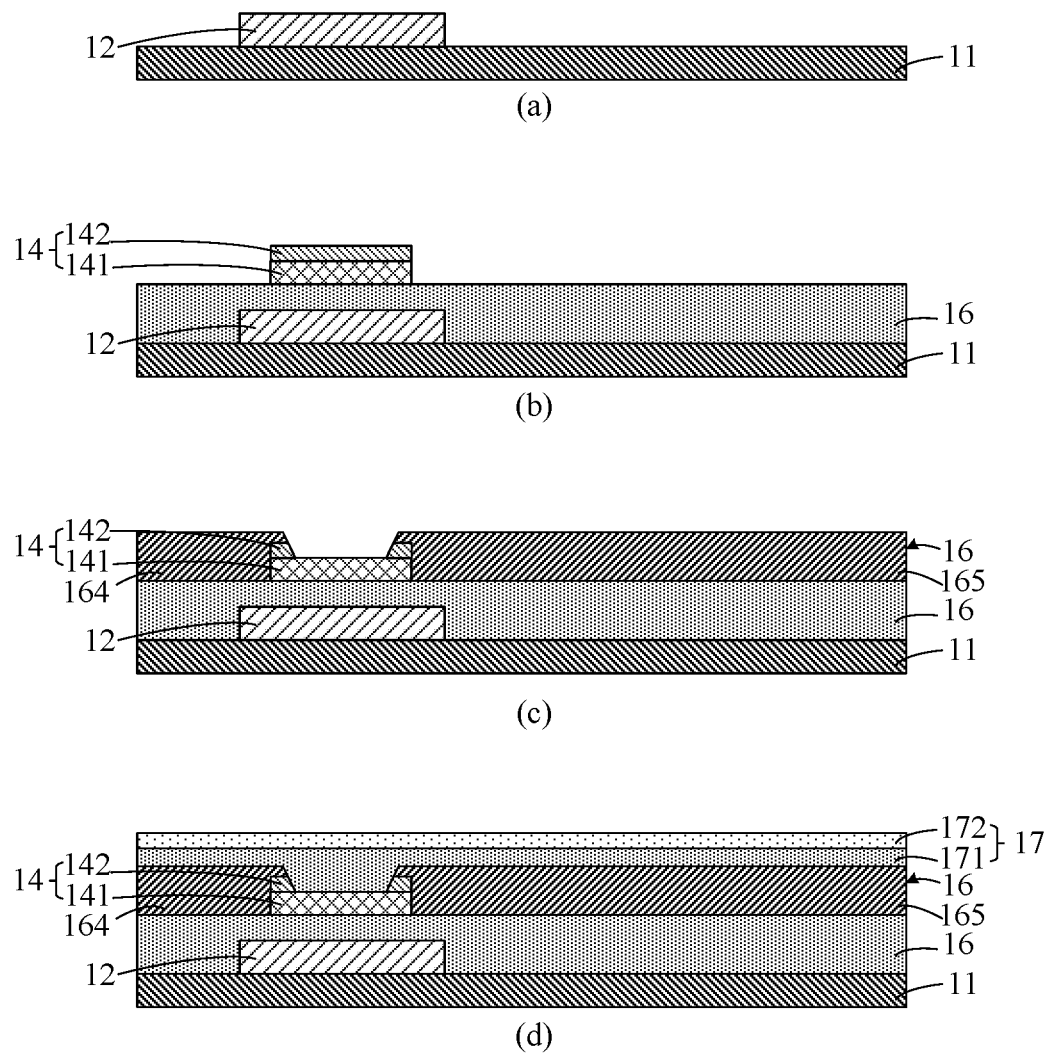
FIG. 13 illustrates a first schematic diagram of a manufacturing method of an optical touch display panel provided by a second embodiment of the present disclosure.
Figure 14:
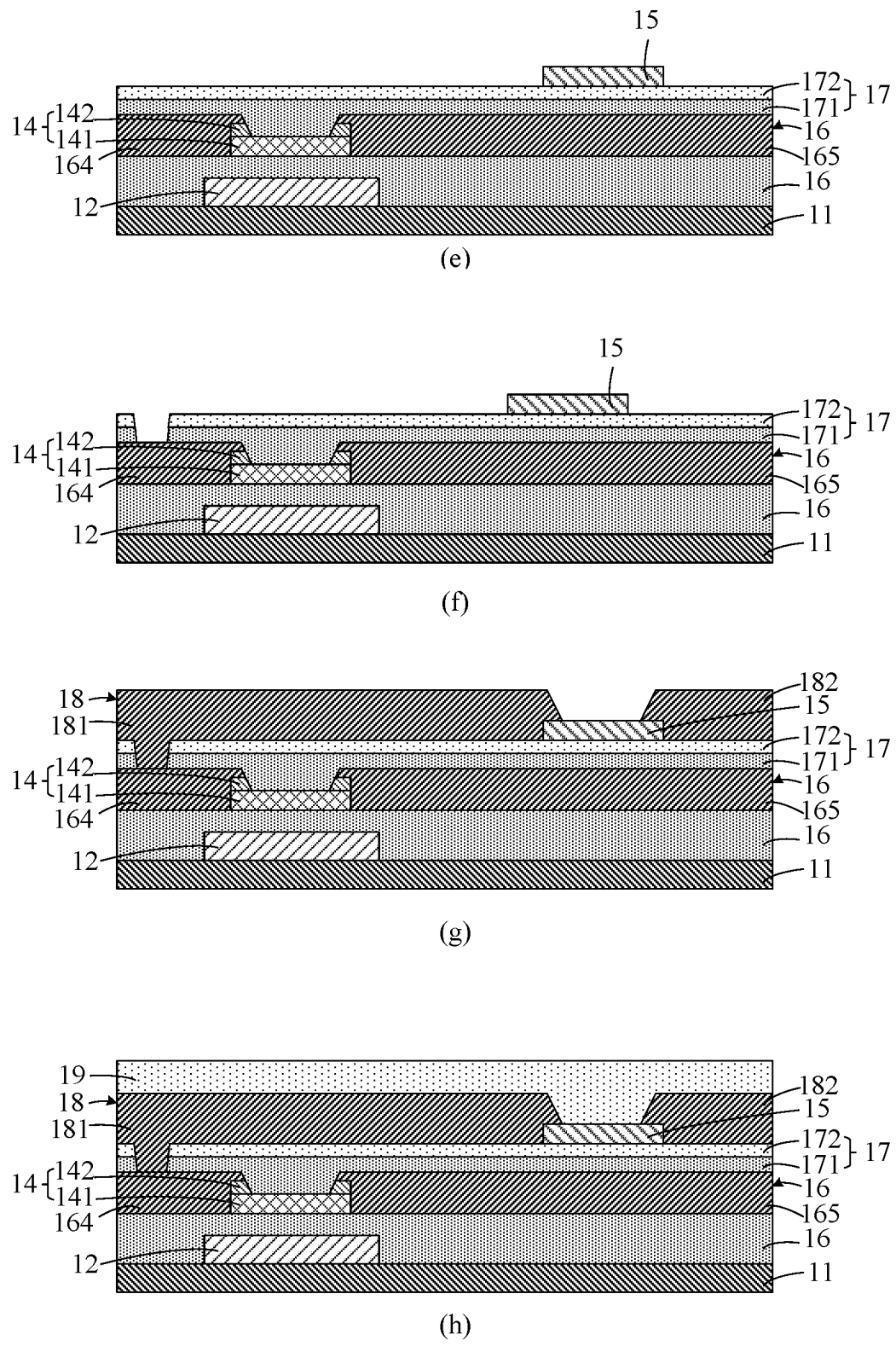
FIG. 14 illustrates a second schematic diagram of a manufacturing method of an optical touch display panel provided by the second embodiment of the present disclosure.

As shown in FIGS. 13 and 14, FIG. 13 illustrates a first schematic diagram of a manufacturing method of an optical touch display panel provided by a second embodiment of the present disclosure, and FIG. 14 illustrates a second schematic diagram of a manufacturing method of an optical touch display panel provided by the second embodiment of the present disclosure. The manufacturing method of the optical touch display panel of the present disclosure includes the following steps.

As shown in a structure of FIG. 13(*a*), a first metal layer 12 is formed on a substrate 11.

A specific method for forming the first metal layer 12 is the same as the method for forming the first metal layer 12 in the manufacturing method of the optical touch display panel provided by the first embodiment and is not repeated herein.

After the first metal layer 12 is formed, the first metal layer 12 can be patterned by a wet etching process to form the gate electrode of the first thin film transistor T1 (that is, the input terminal of the first thin film transistor T1).

As shown in a structure of FIG. 13(*b*), a first insulating layer 13 is formed on one surface of the first metal layer 12. A first semiconductor sublayer 141 and an n-doped hydrogenated amorphous silicon thin film layer are formed on one surface of the first insulating layer 13.

A specific method for forming the first insulating layer 13 is the same as the method for forming the first insulating layer 13 in the manufacturing method of the optical touch display panel provided by the first embodiment and is not repeated herein.

After the first insulating layer 13 is formed, a hydrogenated amorphous silicon thin film layer is formed on the one surface of the first insulating layer 13. The hydrogenated amorphous silicon thin film layer is patterned to form the first semiconductor sublayer 141.

The n-doped hydrogenated amorphous silicon thin film layer is formed on one surface of the first semiconductor sublayer 141. The n-doped hydrogenated amorphous silicon thin film layer is patterned.

As shown in a structure of FIG. 13(c), a second metal layer 16 is formed on one surface of the n-doped hydrogenated amorphous silicon thin film layer and the one surface of the first insulating layer 13. The second metal layer 16 and the n-doped hydrogenated amorphous silicon thin film layer are patterned to form a sixth subpart 164, a seventh subpart 165, and a second semiconductor sublayer 142.

A process of forming the second metal layer 16 is the same as the process of forming the first metal layer 12 and is not repeated herein.

After the second metal layer 16 is formed, the second metal layer 16 and the n-doped hydrogenated amorphous silicon thin film layer can be patterned to form the sixth subpart 164, the seventh subpart 165, and the second semiconductor sublayer 142.

As shown in a structure of FIG. 13(d), a first passivation layer 17 is formed on one surface of the second metal layer 16.

Specifically, the first passivation layer 17 includes a first passivation sublayer 171 and a second passivation sublayer 172 which are stacked up. After the two metal layers and the n-doped hydrogenated amorphous silicon thin film layer are patterned, the first passivation sublayer 171 is formed on the one surface of the second metal layer 16. A material of the first passivation sublayer 171 can be a $Si_xN_y$. The first passivation sub-layer 171 can be formed by a chemical vapor deposition process. Then, a second passivation sublayer 172 is formed on one surface of the first passivation sublayer 171. A material of the second passivation sublayer 172 can be a $SiO_x$. The second passivation sublayer 172 can be formed by a chemical vapor deposition process.

As shown in a structure of FIG. 14(e), a second semiconductor layer 15 is formed on the first passivation layer 17.

Specifically, a metal oxide semiconductor material can be deposited on the first insulating layer 13 by a physical vapor deposition method or a chemical vapor deposition method to form a metal oxide semiconductor film layer. The metal oxide semiconductor film layer is served as the second semiconductor layer 15.

As shown in a structure of FIG. 14(f), the first passivation layer 17 is patterned to form a via.

Specifically, the first passivation sublayer 171 and the second passivation sublayer 172 are patterned by a dry etching process to form the via (not shown in FIG. 14(f)). The above-mentioned via expose one surface of the sixth subpart 164.

As shown in a structure of FIG. 14(g), a third metal layer 18 is formed on the first passivation layer 17. The third metal layer 18 is patterned to form an eighth subpart 181 and a ninth subpart 182.

Specifically, a process of forming the third metal layer 18 is the same as the process of forming the first metal layer 12 and is not repeated herein.

The third metal layer 18 is patterned to form the eighth subpart 181 and the ninth subpart 182. The eighth subpart 181 is connected to the sixth subpart 164 through a via.

As shown in a structure of FIG. 14(h), a second passivation layer 19 is formed on one surface of the third metal layer 18.

Specifically, a material of the second passivation layer 19 can be a $Si_xN_y$ or a $SiO_x$. The second passivation layer 19 can be formed by a chemical vapor deposition process.

One embodiment of the present disclosure provides an optical touch display panel. The display panel includes the above-mentioned optical touch detection circuit. The optical touch detection circuit includes a photosensitive module and a detection module. The photosensitive module is configured to generate a photoelectric signal. The detection module is connected to the photosensitive module. The detection module is configured to implement an optical touch function based on the photoelectric signal. The photosensitive module is excited by light to generate the corresponding photoelectric signal under the light. The detection module is connected to the photosensitive module. The detection module is configured to convert the photoelectric signal based on the photoelectric signal generated by the photosensitive module and is configured to transfer the converted signal to a detection terminal to implement the touch function of the optical touch detection circuit. The optical touch display panel provided by the present disclosure can improve a signal-to-noise ratio of the optical touch detection circuit. This is beneficial for accurately determining a position of an optical touch.

In summary, although the embodiments of present disclosure are described in detail above, but the above-mentioned embodiments are not intended to limit the present disclosure. Those skilled in the art should understand that they may still make modifications to the technical solutions described in the above-mentioned embodiments or make equivalent replacements to some technical features thereof. These modifications or equivalent replacements do not depart from the spirit and scope of the technical solutions of the embodiments of the present disclosure.

What is claimed is:

1. An optical touch detection circuit, comprising:
   a photosensitive module configured to generate a photoelectric signal; and
   a detection module connected to the photosensitive module, the detection module configured to implement an optical touch function based on the photoelectric signal;
   wherein the photosensitive module comprises a first thin film transistor, a control terminal of the first thin film transistor is electrically connected to a first signal input terminal, an input terminal of the first thin film transistor is electrically connected to a second signal input terminal, and an output terminal of the first thin film transistor is electrically connected to the detection module;
   wherein the detection module comprises a storage capacitor and a second thin film transistor; the storage capacitor comprises a first terminal and a second terminal, the first terminal of the storage capacitor is electrically connected to the output terminal of the first thin film transistor, and the second terminal of the storage capacitor is electrically connected to a third signal input terminal; and a control terminal of the second thin film transistor is electrically connected to a fourth signal input terminal, an input terminal of the second thin film transistor is electrically connected to the output terminal of the first thin film transistor, and an output terminal of the second thin film transistor is electrically connected to a detection input terminal; and wherein the first signal input terminal and the third signal input terminal are connected to different distinct voltage signals, respectively.

2. The optical touch detection circuit of claim 1, wherein signals inputted to the first signal input terminal and the second signal input terminal are direct-current voltage signals, a voltage of the signal inputted to the first signal terminal is ranged from −10V to 0V, and a voltage of the second signal input terminal is ranged from 0V to 15V.

3. The optical touch detection circuit of claim 1, wherein when a signal inputted to the fourth signal input terminal is a first voltage level signal, the second thin film transistor is turned on;

when the signal connected to the fourth signal input terminal is a second voltage level signal, the second thin film transistor is turned off; and a voltage of the first voltage level signal is ranged from 25 volts to 35 volts, and a voltage of the second voltage level signal is ranged from −15V to 0V.

4. The optical touch detection circuit of claim 1, wherein a semiconductor material of the first thin film transistor comprises an amorphous silicon, and a semiconductor material of the second thin film transistor is a metal oxide.

5. An optical touch display panel, comprising an optical touch detection circuit, the optical touch detection circuit comprising:

a photosensitive module configured to generate a photoelectric signal; and a detection module connected to the photosensitive module, the detection module configured to implement an optical touch function based on the photoelectric signal;

wherein the photosensitive module comprises a first thin film transistor, a control terminal of the first thin film transistor is electrically connected to a first signal input terminal, an input terminal of the first thin film transistor is electrically connected to a second signal input terminal, and an output terminal of the first thin film transistor is electrically connected to the detection module;

wherein the detection module comprises a storage capacitor and a second thin film transistor; the storage capacitor comprises a first terminal and a second terminal, the first terminal of the storage capacitor is electrically connected to the output terminal of the first thin film transistor, and the second terminal of the storage capacitor is electrically connected to a third signal input terminal; and a control terminal of the second thin film transistor is electrically connected to a fourth signal input terminal, an input terminal of the second thin film transistor is electrically connected to the output terminal of the first thin film transistor, and an output terminal of the second thin film transistor is electrically connected to a detection input terminal; and wherein the first signal input terminal and the third signal input terminal are connected to different distinct voltage signals, respectively.

6. The optical touch display panel of claim 5, wherein when a signal inputted to the fourth signal input terminal is a first voltage level signal, the second thin film transistor is turned on;

when the signal connected to the fourth signal input terminal is a second voltage level signal, the second thin film transistor is turned off; and a voltage of the first voltage level signal is ranged from 25 volts to 35 volts, and a voltage of the second voltage level signal is ranged from −15V to 0V.

7. The optical touch display panel of claim 5, wherein a semiconductor material of the first thin film transistor comprises an amorphous silicon, and a semiconductor material of the second thin film transistor is a metal oxide.

* * * * *